US008057625B2

(12) United States Patent
Reschke et al.

(10) Patent No.: US 8,057,625 B2

(45) Date of Patent: Nov. 15, 2011

(54) OVERPRINTABLE EMBOSSING COATING

(75) Inventors: Guido Reschke, Hunfelden-Ohren (DE); Jurgen Scholzig, Mainz (DE); Herbert Spottke, Muhlheim/Main (DE); Michael Zinke, Limburg (DE)

(73) Assignee: manroland AG, Offenbach (DE)

( * ) Notice: Subject to any disclaimer, the term of this patent is extended or adjusted under 35 U.S.C. 154(b) by 213 days.

(21) Appl. No.: 12/159,157

(22) PCT Filed: Dec. 5, 2006

(86) PCT No.: PCT/EP2006/011633

§ 371 (c)(1), (2), (4) Date: Aug. 22, 2008

(87) PCT Pub. No.: WO2007/073833

PCT Pub. Date: Jul. 5, 2007

(65) Prior Publication Data

US 2009/0008028 A1 Jan. 8, 2009

(30) Foreign Application Priority Data

Dec. 27, 2005 (DE) ........................ 10 2005 062 496
Oct. 15, 2006 (DE) ........................ 10 2006 048 523

(51) Int. Cl.
*B32B 37/10* (2006.01)
*B44C 1/165* (2006.01)

(52) U.S. Cl. ...................... 156/237; 156/390; 156/379.8

(58) Field of Classification Search .................. 156/237
See application file for complete search history.

(56) References Cited

U.S. PATENT DOCUMENTS

| | | | | |
|---|---|---|---|---|
| 4,658,723 | A * | 4/1987 | Tokuno et al. | 101/181 |
| 2007/0137769 | A1* | 6/2007 | Payne et al. | 156/167 |
| 2007/0163455 | A1* | 7/2007 | Eitel et al. | 101/216 |

FOREIGN PATENT DOCUMENTS

| | | | |
|---|---|---|---|
| DE | 19836669 | A1 | 2/2000 |
| DE | 10232255 | A1 * | 2/2004 |
| EP | 0569520 | B1 | 1/1996 |
| JP | 55028011 | A * | 2/1980 |
| WO | WO 97/19763 | A | 6/1997 |
| WO | WO 2005/100024 | A | 10/2005 |
| WO | WO 2005/100028 | A | 10/2005 |
| WO | WO 2005100028 | A1 * | 10/2005 |

* cited by examiner

*Primary Examiner* — Philip Tucker
*Assistant Examiner* — Vicki Wu
(74) *Attorney, Agent, or Firm* — Leydig, Voit & Mayer, Ltd.

(57) ABSTRACT

The invention relates to a coating unit (2) for transferring imaging or covering layers from a transfer film (5) to a printed material. The coating unit is flexible thus enabling the integrated production of complex printed material. In particular, overprinting of film coatings should be able to be carried out in a problem-free manner. One or several discharge devices (E, EI), which are connected to the film application module (FA), are used for modifying the surface tension of the transfer film (5) or the printed sheet in the rotary sheet printing machine ensuring that the printing and also the film-coated surfaces of the printed sheet are of high quality.

2 Claims, 2 Drawing Sheets

OVERPRINTABLE EMBOSSING COATING

CROSS-REFERENCE TO RELATED APPLICATIONS

This patent application is the national phase of PCT/EP2006/011633, filed Dec. 5, 2006, which claims the benefit of German Patent Nos. 102005062496.0, filed Dec. 27, 2005 and 102006048523.8, filed Oct. 15, 2006, which is incorporated herein by reference.

FIELD OF THE INVENTION

The invention relates to a method and a device for the transfer of imaging or covering layers from a carrier film onto printing sheets with subsequent overprinting.

BACKGROUND OF THE INVENTION

Producing metal layers on printing sheets by means of a film transfer method is known. A printing material and a printing device that uses the material are described in EP 0 569 520 B1. Printing units and a coating unit are arranged in a sheet processing machine having a feeder and a delivery unit. An adhesive pattern is applied as a print pattern in a planographic printing process in at least one printing unit. An impression cylinder, a press roller and a film guide are provided in the coating unit downstream of the printing unit. A film strip from a film supply reel is led through the transfer nip of the coating unit between the impression cylinder and the press roller, and is again wound up on the outlet side after leaving the coating unit. The transfer film contains a carrier film onto which functional layers of various types such as metallic layers of aluminum or plastic layers can be applied. A separation layer, which enables the functional layer to be pulled off the carrier layer, is provided between the functional layer and the carrier film.

After the printing sheet has been provided with a two-dimensional adhesive deposit or an adhesive pattern, it is led through the coating unit. In the coating unit, the printing sheet on the impression cylinder is brought into connection with the film material by the press roller. In the process, the functional layer, which is facing downward, becomes tightly bonded to the adhesive. Thereafter the functional layer adheres only in the areas of the pattern that are furnished with adhesive or in two-dimensional adhesive areas. The functional layer is removed from the carrier film in the area of the adhesive patterns. The printing sheet is delivered in the coated state.

Some problems with the above-described methods are that the methods are not flexibly usable, require extensive know-how regarding the complex processes, and are difficult to manage. In particular, the further processing is limited in previously known production methods.

BRIEF SUMMARY OF THE INVENTION

An object of the invention is therefore to provide a method and a device that permits a foil coating of printing sheets with subsequent overprinting to be performed easily, securely, economically and precisely. A further object is to provide such a method and the device that are easy to manage.

The invention advantageously provides a method which, if applied for foil application, makes it possible to apply ink without problems to print substrates of the most diverse types, including the areas furnished with metallic layers during the foil application, due to the pretreatment. A great variety of print substrates as well as functional packages can thereby be furnished with a decorative effect. For instance, a sheet-fed rotary printing press can be used with the film coating being performed with a cold foil stamping process.

The printability of the areas coated by the foil application is improved by increasing the surface tension. For that purpose, the coated print sheet is subjected to a corona discharge or a discharge plasma. Thereafter it is possible to print with high quality.

The equipment for this purpose can be used according to the invention in a sheet-fed rotary printing press without great expense, by being employed in association with the upper side of the substrate in the coating unit for foil application or in a downstream sheet guiding device. A pretreatment of the print substrate and the application foil can likewise be performed by a corona treatment.

An advantageous aspect of the method is that little or no heat is introduced in comparison with hot foil coating. This results in a sharply reduced register delay, which is particularly important for metallic print substrates.

The invention will be presented in detail below with reference to illustrated embodiments.

DETAILED DESCRIPTION OF THE INVENTION

Figure 1:
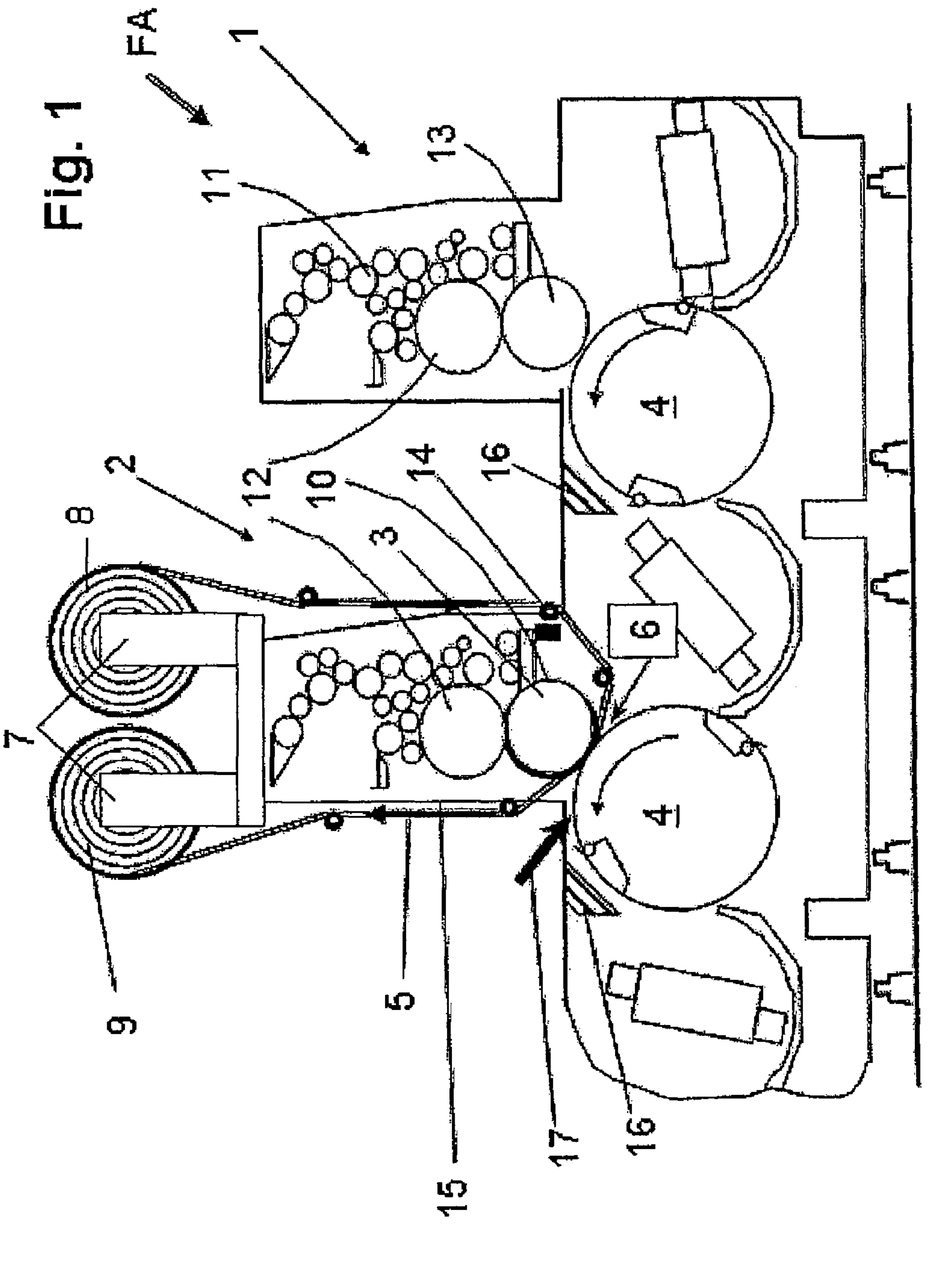
FIG. 1 is a schematic side view of a portion of a sheet-fed rotary printing press including one configuration of an illustrative coating unit according to the invention.

A portion of a sheet-fed rotary printing press that contains two printing units is shown in FIG. 1. In the illustrated portion of the printing press, a printing sheet is first provided with a two-dimensional or imaging adhesive pattern (printing unit as application unit 1). In the subsequent printing unit, the printing sheet is guided together with a transfer film 5 under pressure through a transfer nip 6 (coating unit 2). Application unit 1 can be a conventional offset printing unit with inking unit 11, a plate cylinder 12 and a blanket cylinder 13. The blanket cylinder 13 cooperates with an impression cylinder 4.

The coating unit 2 can likewise be formed by an offset printing unit. The transfer nip 6 is formed in the coating unit 2 by a press roller 3 and an impression cylinder 4. The press roller 3 can correspond to the blanket cylinder. The press roller 3 can also correspond to the form cylinder of a varnishing module. The press roller 3 carries a pressing tensioner 10 to generate an intensive pressing of the transfer film against the print substrate in transfer nip 6. A film guide 14 for transfer films is shown inside the film transfer coating unit 2. The transfer film 5 is led in and out via protection devices 15 of the coating unit 2.

Alternatively, an integrated foil application module FA can be created by the installation of a film guide in the application unit 1. After the coating of the print substrate with an adhesive, the transfer film is then used for cold foil stamping in an additional transfer nip.

A film supply reel 8 is assigned to the coating unit 2 on the side of the sheet feeder. The film supply reel 8 has a rotary drive 7 for continuously controlled supply of the transfer film to the coating unit 2. Deflection or tension cylinders can be provided in the film supply to guide the transfer film 5 in essentially a constant tension with respect to the press roller 3. A film collection reel 9 for the consumed film material is provided on the downstream side of the printing unit. Providing a rotary drive 7 on the film collection reel 9 is always advantageous.

Dryers 16 for drying the adhesive application or the entire foil coating can additionally be provided in the film application module thus formed by the application unit 1 and the coating unit 2. UV dryers can be considered for this purpose.

According to an aspect of the invention, a pretreatment of the raw print substrate, the application film, or the print substrate coated by cold foil coating can be performed by a corona treatment. How to carry out a so-called corona or plasma treatment to improve ink adhesion when metallic print substrates or print substrates made of plastic film are used is conventionally known. The surface tension of the print substrate is thereby modified by subjecting the film surface to a corona discharge, or a plasma created by a discharge, in such a way that printing inks adhere securely. An optimized appearance of the printing can be achieved in this way.

Figure 2:
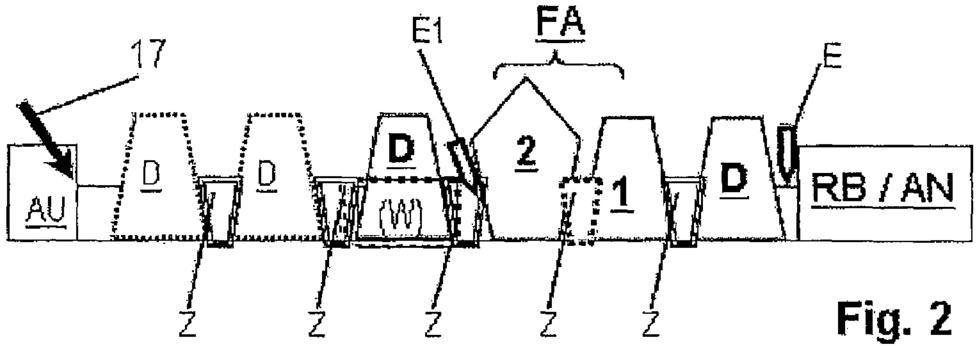
FIG. 2 is a schematic side view of a sheet-fed printing machine with a coating unit according to FIG. 1.

An appropriately configured printing machine is shown in FIG. 2. A reel-type sheet feeder RB or a sheet feeder AN is provided. By means of the reel-type sheet feeder RB, printing sheets are cut off with precise registration from a reel and supplied to the printing machine at the machine cycle rate. A printing unit D or a varnishing module is arranged immediately downstream.

In the area of the sheet guide from the sheet feeder RB or AN into the first workstation of the printing machine, a discharge device E can be provided in order to improve in a conventional manner the surface properties of the printing sheets for accepting coatings. However, the discharge device E can also be integrated into the sheet feeder RB or AN.

An application unit 1 and a coating module 2, which can also be arranged as an integrated foil application module FA, immediately follow a printing unit or a varnishing module D. Thereafter, several additional printing units D are optionally provided up to a delivery unit AU.

A second discharge device E1 is provided in the area of the sheet guiding devices from the coating module 2 to the subsequent printing unit D. A second discharge device E serves to improve the surface properties of the printing sheet coated by foil application for the acceptance of additional coatings such as printing inks or varnishes.

Between respective printing units D or in printing units D or upstream of and/or inside of and/or downstream of the foil application module FA, intermediate dryers Z are optionally provided. The coating previously applied in a respective workstation can be dried with each intermediate dryer Z in a manner optimized for the process. Intermediate dryers Z can be switched for this purpose as a function of the process.

A turning device W can also be provided between the printing units D. This can serve to flip a printing sheet furnished on one side with a foil coating and possibly with impressions, so that its underside can subsequently be printed or coated.

Figure 3:
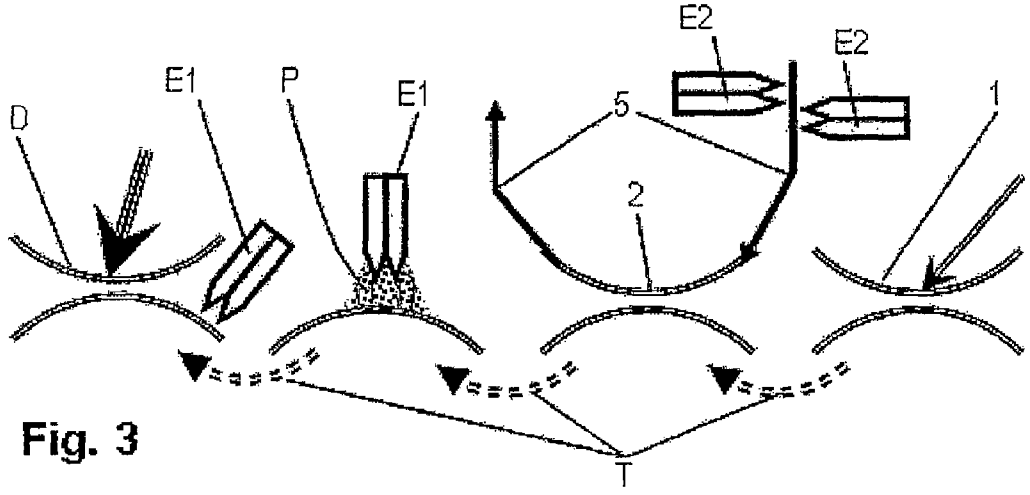
FIG. 3 is a schematic representation of an embodiment of a coating method according to the invention.

The method of printing print substrates furnished with a previous foil application is schematically represented in FIG. 3. Four workstations, which are coupled respectively by a sheet transfer device T so that the printing sheets run continuously through all stations, are shown in FIG. 4. The application unit 1 is provided as the first workstation. As described above, the adhesive pattern necessary for foil transfer is applied there to the printing sheet.

The coating unit 2 is provided as the second workstation. There, the foil is applied from the transfer film 5 in the transfer nip 6 to the printing sheet furnished with the adhesive pattern. A film supply for transfer film 5 is provided for this purpose. According to the invention, a discharge device E2 for surface treatment can be arranged on either or both sides of the transfer film 5 being supplied. Thus, the surface properties of the imaging layer on the transfer film 5 can be modified from a given side or from both sides. The influencing of the side of the imaging layer facing the print substrate can improve its adhesion to the print substrate.

A surface treatment of the printing sheet by means of the discharge device E1 is provided in a third workstation. There the printing sheet, held on a sheet-guiding drum or a transfer cylinder, is treated by a corona discharge directly or via a plasma P or an air stream carrying plasma P. A good distribution of gas particles bearing charges is particularly possible when a carrying air stream is used for the discharge plasma. The surface tension, particularly of the parts of the print substrate coated by foil application, is thereby increased quite uniformly. The preparation for additional work processes is thus optimal. The discharge device E can be combined with an intermediate dryer Z. The discharge and optionally the intermediate drying can be controlled centrally in conjunction with process parameters and in conjunction with the types of print substrates, foils and adhesives.

Finally, a printing unit D is provided as the fourth workstation. Here, a final printing by printer ink or a coating by means of varnishing takes place. A discharge station E1 can also be arranged on the corresponding impression cylinder of printing unit D. The printing or coating can be done particularly efficiently and with high quality due to the previous surface treatment of the foil areas of the printing sheet. In particular, even printer inks or varnishes that could otherwise not be considered for the printing or coating of films, but that are well-suited for normal print substrates, can be used here.

For the method of foil application with subsequent printing on print substrates of various types, the following steps can be provided:

1. Optional corona/plasma pretreatment of the printing substrate in this system or a system module or a reel-type sheet feeder upstream of the machine;
2. Application of adhesive (e.g., UV adhesive) via a printing or varnishing unit or integrated compact coating device;
3. Optionally, corona/plasma treatment of the foil layer to be applied (depending on the adhesion properties of the surfaces in question);
4. Foil application in a transfer nip (preferably tangential guidance of the transfer film on the blanket cylinder, form cylinder or press roller);
5. Optional corona/plasma treatment of the applied foil layer on the print substrate directly following foil transfer;
6. Optionally, an intermediate drying after foil application;
7. Optional corona/plasma treatment of the applied foil layer on the printing substrate directly before further printing or additional coating of the printing sheet already coated by foil application; and
8. The required colored motif is printed with one or more inks and optionally another intermediate drying.

The necessary or possible configurations of a sheet-fed rotary printing press with these process steps, including one or more foil application modules, are varied and follow logically from the exemplary devices already described.

LIST OF REFERENCE CHARACTERS

1 Application unit
2 Coating unit
3 Press roller
4 Impression cylinder
5 Transfer film/film web
6 Transfer nip

7 Reel drive
8 Film supply reel
9 Film collection reel
10 Press tensioner
11 Inking unit
12 Plate cylinder
13 Blanket cylinder
14 Guiding device
15 Printing unit protector
16 Dryer
17 Monitoring device
D Printing unit
AN Feeder
RB Reel-type sheet feeder
AU Delivery
FA Foil application module
W Turning mechanism
E Discharge device
E1 Discharge device
E2 Discharge device
T Sheet transfer mechanism
P Discharge plasma

The invention claimed is:

1. A method for transferring an application layer from a transfer film onto printing sheets in a sheet fed offset printing machine including an application unit and a coating unit having a transfer nip comprising the steps of:

subjecting the printing sheets to a non-contact surface treatment of a corona or plasma discharge prior to direction to the application unit;

applying adhesive to the printing sheet in the application unit;

directing to the coating unit a transfer film having a carrier layer and an application layer, transferring the application layer from the transfer film to the printing sheet by guiding the transfer film along the surface of a press roller in a transfer nip of the coating unit and placing the transfer film with application of pressure against the printing sheet such that the application layer detaches from the transfer film and adheres to the adhesive;

guiding the printing sheet furnished with the application layer on a guide surface;

subjecting the application layer of the transfer film to a non-contact surface treatment of a corona or plasma discharge prior to transfer of the transfer film through the transfer nip for increasing the adherence of the application layer to the printing sheets upon passage through the transfer nip, and thereafter printing over the application layer adhering to the printing sheets with a colored printing ink.

2. A method for transferring an application layer from a transfer film onto printing sheets in a sheet fed offset printing machine including an application unit and a coating unit having a transfer nip comprising the steps of:

subjecting the printing sheets to a non-contact surface treatment of a corona or plasma discharge prior to direction to the application unit;

applying adhesive to the printing sheet in the application unit;

directing to the coating unit a transfer film having a carrier layer and an application layer, transferring the application layer from the transfer film to the printing sheet by guiding the transfer film along the surface of a press roller in a transfer nip of the coating unit and placing the transfer film with application of pressure against the printing sheet such that the application layer detaches from the transfer film and adheres to the adhesive;

guiding the printing sheet furnished with the application layer on a guide surface;

subjecting the application layer of the transfer film to a first non-contact surface treatment of a corona or plasma discharge prior to transfer of the transfer film through the transfer nip for increasing the adherence of the application layer to the printing sheets upon passage through the transfer nip;

subjecting the application layer adhering to the printing sheets after transfer through the transfer nip to a second noncontact surface treatment of a corona or plasma discharge for increasing the surface tension of the application layer_adhering to the printing sheets; and thereafter printing over the application layer adhering to the printing sheets with a colored printing ink.

* * * * *